United States Patent
Aposhian et al.

(10) Patent No.: US 8,851,278 B2
(45) Date of Patent: Oct. 7, 2014

(54) SLAB LIFTING CONVEYOR SYSTEM FOR AUTOMATED TURF HARVESTING

(71) Applicants: Steven R. Aposhian, Farmington, UT (US); Eric E. Aston, Salt Lake City, UT (US); William M. Decker, Salt Lake City, UT (US); Samuel Drake, Cottonwood Heights, UT (US); Isaac R. Jones, Round Rock, TX (US)

(72) Inventors: Steven R. Aposhian, Farmington, UT (US); Eric E. Aston, Salt Lake City, UT (US); William M. Decker, Salt Lake City, UT (US); Samuel Drake, Cottonwood Heights, UT (US); Isaac R. Jones, Round Rock, TX (US)

(73) Assignee: FireFly Equipment, LLC, Farmington, UT (US)

( * ) Notice: Subject to any disclaimer, the term of this patent is extended or adjusted under 35 U.S.C. 154(b) by 10 days.

(21) Appl. No.: 13/851,457

(22) Filed: Mar. 27, 2013

(65) Prior Publication Data
US 2013/0256099 A1    Oct. 3, 2013

Related U.S. Application Data

(60) Provisional application No. 61/619,395, filed on Apr. 2, 2012.

(51) Int. Cl.
*B65G 21/14* (2006.01)
*A01B 45/04* (2006.01)

(52) U.S. Cl.
CPC .................................. *A01B 45/045* (2013.01)
USPC .................. 198/861.1; 198/468.8; 198/477.1; 198/812; 198/813; 172/19

(58) Field of Classification Search
CPC ........ B65G 15/60; B65G 21/00; B65G 21/10; B65G 21/14; B65G 23/44
USPC ........ 198/468.8, 476.1, 477.1, 809, 812, 813, 198/861.1, 861.2; 172/19, 20; 414/523
See application file for complete search history.

(56) References Cited

U.S. PATENT DOCUMENTS

| | | | | |
|---|---|---|---|---|
| 5,458,051 | A * | 10/1995 | Alden et al. | 99/349 |
| 6,681,864 | B2 * | 1/2004 | Tvetene et al. | 172/20 |
| 6,783,318 | B2 * | 8/2004 | Tvetene et al. | 414/789.7 |
| 7,407,362 | B2 * | 8/2008 | Brouwer et al. | 414/736 |
| 8,118,154 | B2 * | 2/2012 | Tvetene et al. | 198/468.8 |
| 8,336,638 | B2 * | 12/2012 | Brouwer et al. | 172/20 |

* cited by examiner

*Primary Examiner* — Gene Crawford
*Assistant Examiner* — Keith R Campbell
(74) *Attorney, Agent, or Firm* — Brian Tucker; Kirton McConkie (57) ABSTRACT

The present invention extends to a lifting system for lifting a portion of a conveyor. The lifting system maintains the length of the conveyor while changing the shape of the conveyor to lift the top surface of the conveyor belt towards a stacking head. This design facilitates the quick lifting and lowering of slabs of sod while minimizing the stress on the sod harvesting machine.

20 Claims, 7 Drawing Sheets

SLAB LIFTING CONVEYOR SYSTEM FOR AUTOMATED TURF HARVESTING

CROSS-REFERENCE TO RELATED APPLICATIONS

This application claims the benefit of U.S. Provisional Patent Application No. 61/619,395, filed Apr. 2, 2012, titled Slab Lifting Conveyor System For Automated Turf Harvesting.

BACKGROUND

Turf grass (sod) is a living organism that must be handled properly to ensure its survival when it is removed from one location and transplanted to another. Sod is generally harvested using large machinery that cuts slabs of sod from the soil and stacks them on pallets. The speed at which a machine can stack slabs often determines the speed at which the machine can harvest sod.

Figure 1:
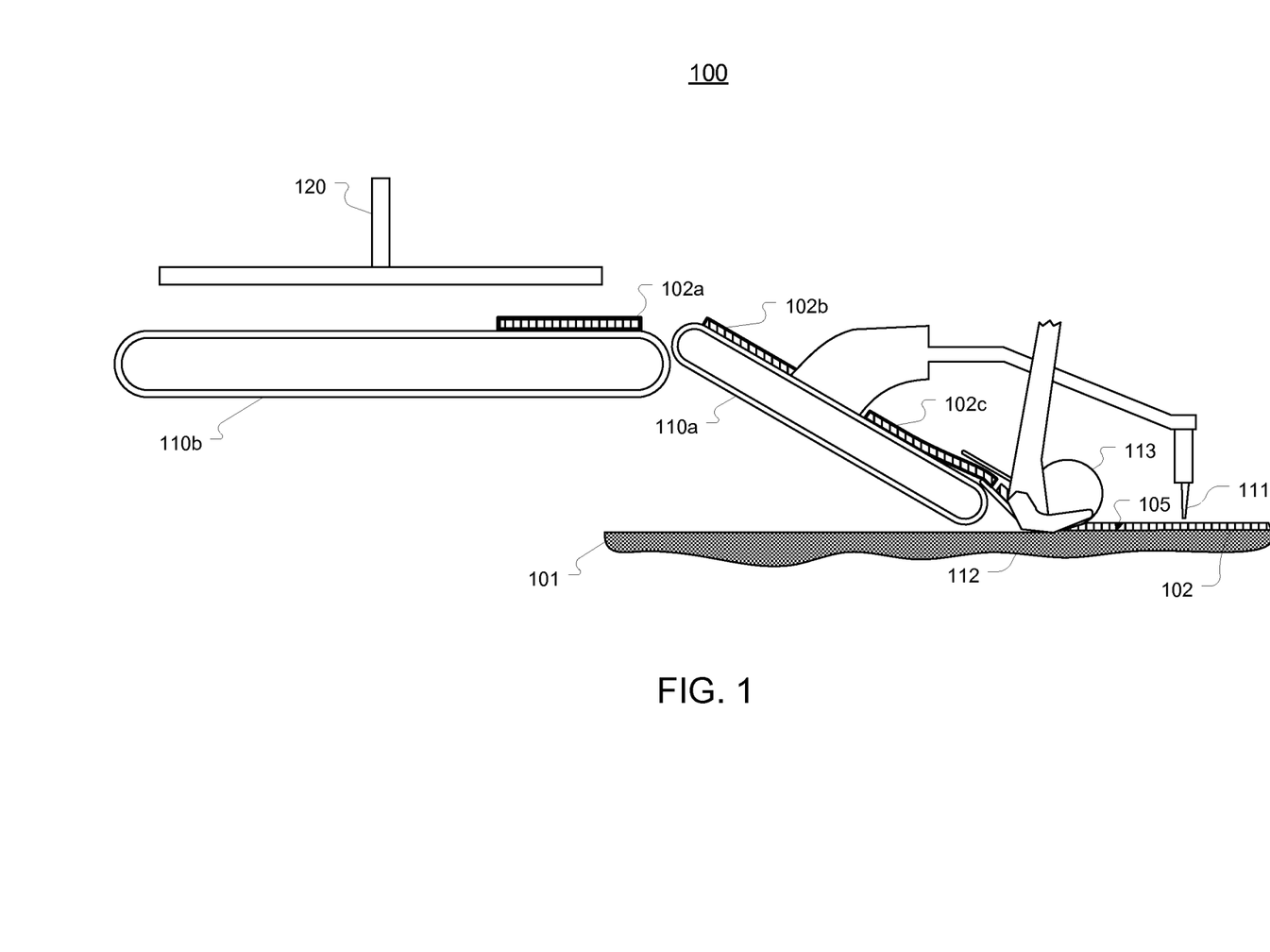
FIG. 1 illustrates an example of sod harvesting machine configuration in which the present invention can be implemented.

FIG. 1 illustrates a portion of a sod harvesting machine 100 that includes a typical cutting head, conveyor system, and stacking system. The cutting head of FIG. 1 includes a first blade 111, a second blade 112, and a roller 113. Blade 111 is periodically lowered into the sod to make vertical cuts defining an initial width of the slabs. Blade 112 oscillates back and forth underneath the sod to sever the slab from the underlying soil. Roller 113 applies pressure to the sod as it is cut to facilitate the cutting of clean slabs.

Slabs cut by the cutting head are routed to conveyor 110a which lifts the slabs up to conveyor 110b. Once a sufficient number of slabs are positioned on conveyor 110b, stacking head 120 (or in some sod harvesters, multiple stacking heads) descends to the slabs, picks them up (e.g. via hooks), moves overtop a pallet, and drops the slabs on the pallet. This process continues until a pallet is filled.

A key factor that determines how quickly a sod harvester can operate is the rate at which the slabs can be removed from the conveyor and stacked on the pallet. To increase this rate, various approaches have been used. Of relevance to the present invention, some sod harvesting machines lift the conveyor towards the stacking head as opposed to dropping the stacking head to the conveyor. Lifting the conveyor increases the speed of slab removal because the stacking head is not required to move up and down. In other words, in such cases, the stacking head can quickly move back and forth from the conveyor to the pallet.

Figure 2A:
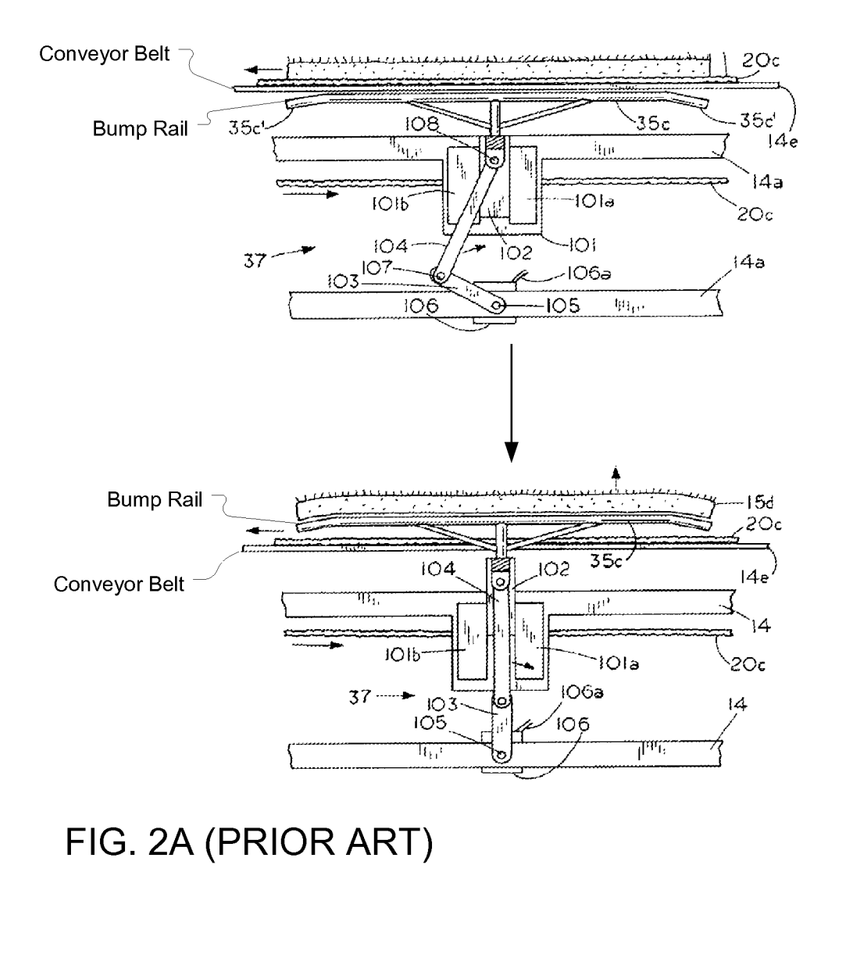
FIG. 2A illustrates a lifting system that pushes a slab up off of a conveyor with a push through type of lifting tray.
Figure 2B:
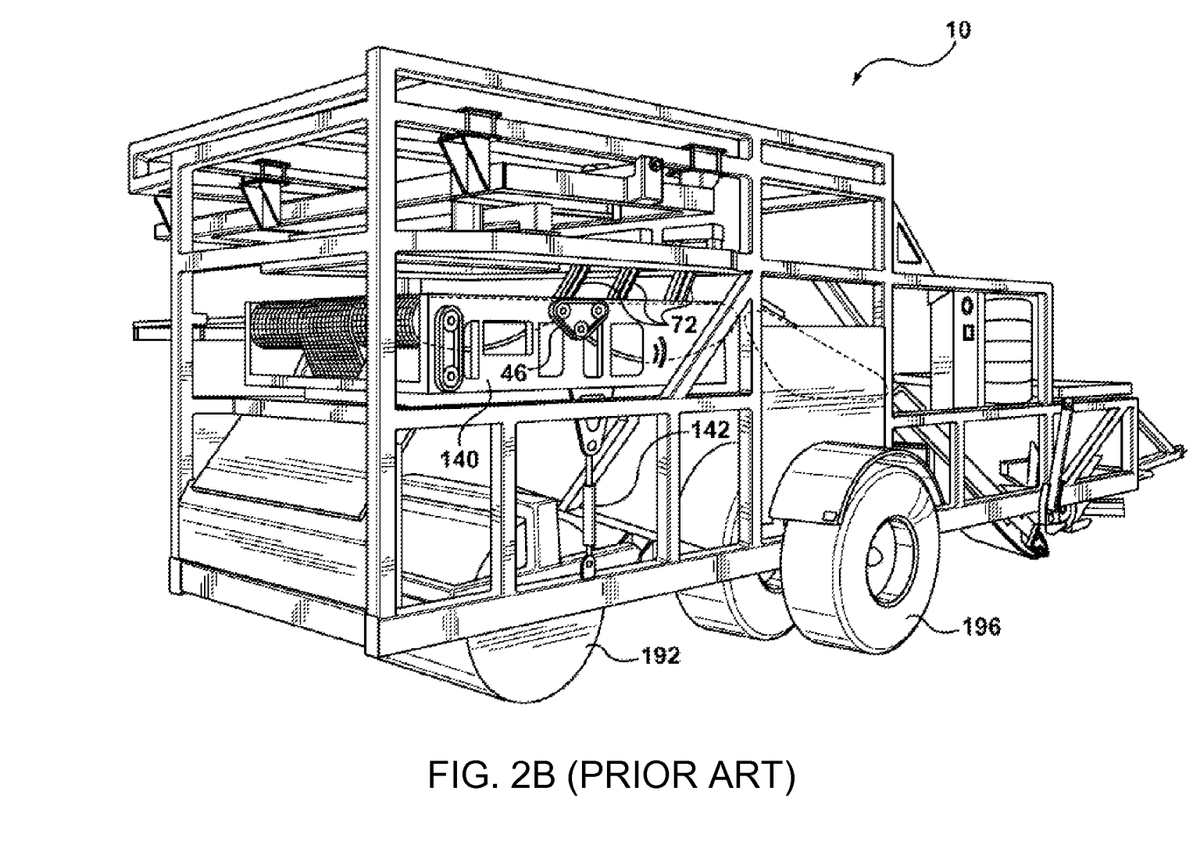
FIG. 2B illustrates a lifting system that lifts the entire conveyor.

Various problems exist with current designs of conveyor lifting systems. Two of these current designs are shown in FIGS. 2A and 2B.

Some lifting systems push the slab up off of the secondary conveyor with a push through type of lifting tray which must lift and lower very quickly to be clear of the next slab coming up the conveyor. FIG. 2A, which includes reproductions of FIGS. 1A, 6A, and 6B of U.S. Pat. No. 8,118,154 to Tvetene, represents this type of lifting system. As best shown in the figure on the left, the conveyor is comprised of various thin belts 20a, 20b, and 20c with bump bed rails 35a-35d disposed therebetween. As shown in the figures on the right, each bump bed rail is raised up past the belts to lift a slab off the belts. The bump bed rails must raise and lower quickly which causes the hydraulic linear actuator seals used in such systems to wear out quickly and fail leading to frequent replacement and high maintenance costs.

Some lifting systems lift the entire conveyor. FIG. 2B, which is a reproduction of FIG. 1 of U.S. Pat. No. 8,336,638 to Brouwer, et al., shows a lifting systems that lifts the entire conveyor up to the capture position and then returns to the rest position. As shown, a bed frame 140 that houses the conveyor is lifted and lowered by piston and cylinder sets 142. This operation is slow and requires that the slabs be spaced far apart. This adversely affects the productivity of the machine.

In each of these different types of systems, because of the inertia of the lift tray, lift linkage, and slab, large forces are required of the actuators in high speed lifts. Thus in hydraulic systems, the actuators must be relatively large with correspondingly high peak fluid flows. Unless a high pressure fluid accumulator is used, the peak flow will drop the system pressure in other parts of the system disturbing the performance of other hydraulic functions. A high pressure accumulator is an additional manufacturing and maintenance cost.

BRIEF SUMMARY

The present invention extends to a lifting system for lifting a portion of a conveyor. The lifting system maintains the length of the conveyor while changing the shape of the conveyor to lift the top surface of the conveyor belt towards a stacking head. This design facilitates the quick lifting and lowering of slabs of sod while minimizing the stress on the sod harvesting machine.

In one embodiment, the present invention is implemented as a lifting system for temporarily lifting a portion of a conveyor on a sod harvesting machine to allow one or more slabs of sod on the portion of the conveyor to be picked up by a stacking head. The lifting system comprises: a conveyor from which slabs of sod are picked up by a stacking head of a sod harvesting machine; a conveyor support structure around which the conveyor rotates, the conveyor support structure defining the shape of the conveyor, the conveyor support structure further including a plurality of fixed components and a plurality of pivoting components; and a lifting mechanism that causes the pivoting components of the conveyor support structure to pivot which lifts a portion of the conveyor upwards towards the stacking head thereby changing the shape of the conveyor while retaining consistent tension on the conveyor.

In another embodiment, the present invention is implemented as a lifting system for temporarily lifting a portion of a conveyor on a sod harvesting machine to allow one or more slabs of sod on the portion of the conveyor to be picked up by a stacking head. The lifting system comprises: a conveyor from which slabs of sod are picked up by a stacking head of a sod harvesting machine; and a conveyor support structure around which the conveyor rotates. The conveyor support structure includes: a plurality of fixed rollers that define the front and back extents of the shape of the conveyor; and a plurality of pivoting components which rotate to cause a portion of the conveyor to be raised towards the stacking head while the conveyor retains a substantially constant tension.

This summary is provided to introduce a selection of concepts in a simplified form that are further described below in the Detailed Description. This Summary is not intended to identify key features or essential features of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to a lifting system for lifting a portion of a conveyor. The lifting system maintains the length of the conveyor while changing the shape of the conveyor to lift the top surface of the conveyor belt towards a stacking head. This design facilitates the quick lifting and lowering of slabs of sod while minimizing the stress on the sod harvesting machine.

In one embodiment, the present invention is implemented as a lifting system for temporarily lifting a portion of a conveyor on a sod harvesting machine to allow one or more slabs of sod on the portion of the conveyor to be picked up by a stacking head. The lifting system comprises: a conveyor from which slabs of sod are picked up by a stacking head of a sod harvesting machine; a conveyor support structure around which the conveyor rotates, the conveyor support structure defining the shape of the conveyor, the conveyor support structure further including a plurality of fixed components and a plurality of pivoting components; and a lifting mechanism that causes the pivoting components of the conveyor support structure to pivot which lifts a portion of the conveyor upwards towards the stacking head thereby changing the shape of the conveyor while retaining consistent tension on the conveyor.

In another embodiment, the present invention is implemented as a lifting system for temporarily lifting a portion of a conveyor on a sod harvesting machine to allow one or more slabs of sod on the portion of the conveyor to be picked up by a stacking head. The lifting system comprises: a conveyor from which slabs of sod are picked up by a stacking head of a sod harvesting machine; and a conveyor support structure around which the conveyor rotates. The conveyor support structure includes: a plurality of fixed rollers that define the front and back extents of the shape of the conveyor; and a plurality of pivoting components which rotate to cause a portion of the conveyor to be raised towards the stacking head while the conveyor retains a substantially constant tension.

Figure 3A:
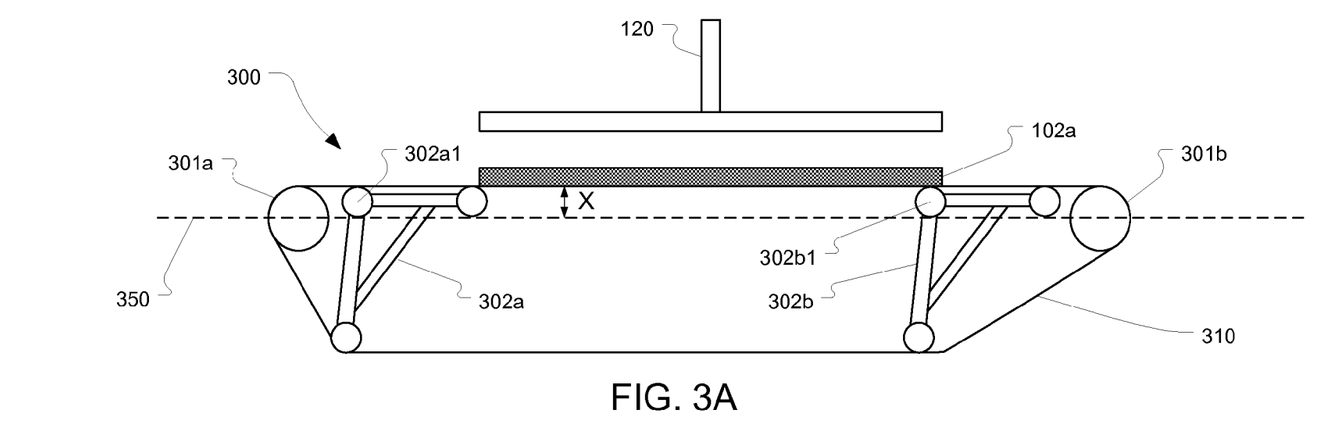
FIGS. 3A and 3B illustrate a lifting system in a raised and lowered position respectively in accordance with the present invention.
Figure 3B:
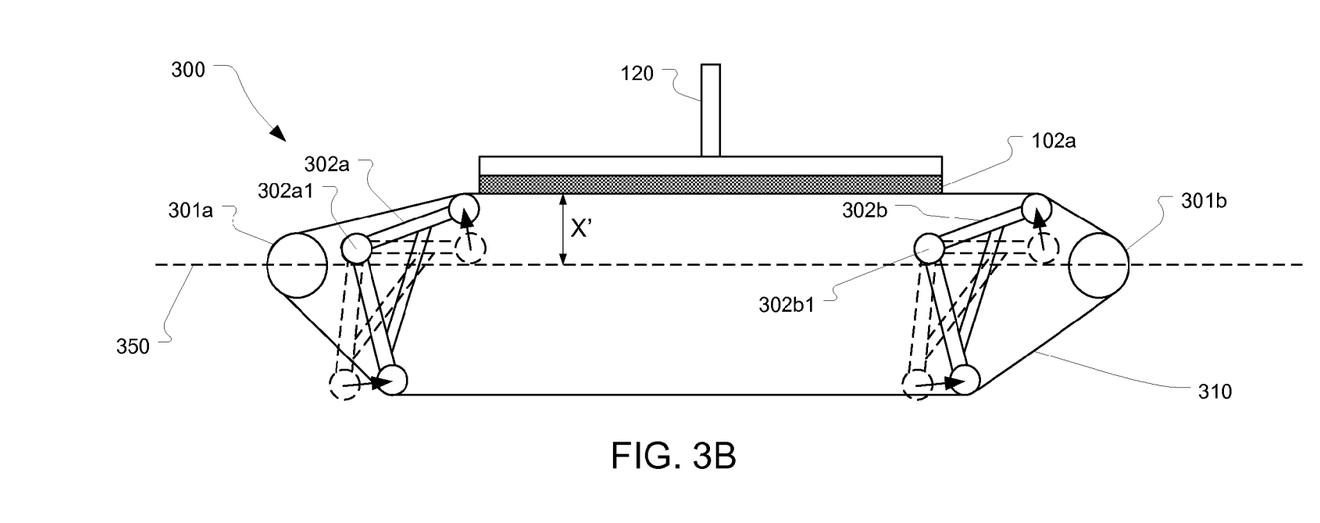

FIGS. 3A and 3B illustrate the lifting system 300 of the present invention in a raised and lowered position respectively. As shown, lifting system 300 includes a conveyor 310 whose shape is defined by various components including fixed components 301a and 301b (which may be rollers, pulleys, or other means for causing conveyor 310 to rotate) and pivoting components 302a and 302b. In the example lifting system 300 shown in FIGS. 3A and 3B, fixed components 301a and 301b remain stationary whereas pivoting components 302a and 302b are rotatably fixed at pivots 302a1 and 302b1 respectively.

FIG. 3A shows conveyor 310 in a lowered position. In this position, slabs of sod (e.g. slab 102a) are advanced until they are positioned under stacking head 120. Line 350 defines an axis relative to the top of conveyor 310. In FIG. 3A, the distance between line 350 and the top of conveyor 310 is shown as being equal to X.

FIG. 3B shows conveyor 310 in a raised position. Conveyor 310 is raised to this position when one or more slabs of sod are positioned under stacking head 120 and are ready to be picked up. To enable stacking head 120 to pick up the slabs, lifting system 300 raises conveyor 310 by changing the shape of conveyor 310. This is accomplished by rotating pivoting components 302a and 302b about pivots 302a1 and 302b1 respectively.

This rotation of pivoting components 302a and 302b lifts the top of conveyor 310 towards stacking head 120 so that the slabs of sod on conveyor 310 can be secured by stacking head 120. As shown in FIG. 3B, as pivoting components 302a and 302b pivot, the top arms of these components move upward while the bottom arms move forward (i.e. to the right in FIG. 3B). This equal movement in the upward and forward directions reshapes conveyor 310 without changing the tension on conveyor 310. In this manner, conveyor 310 can be quickly raised without affecting the rotation of the conveyor (i.e. conveyor 310 can continue to rotate to advance subsequent slabs during the lifting process).

After conveyor 310 has been raised and slab 102a picked up by stacking head 120, pivoting components 302a and 302b can quickly return to their original position thus causing conveyor 310 to return to the lowered position where it can advance additional slabs of sod to the pickup position.

Figure 4A:
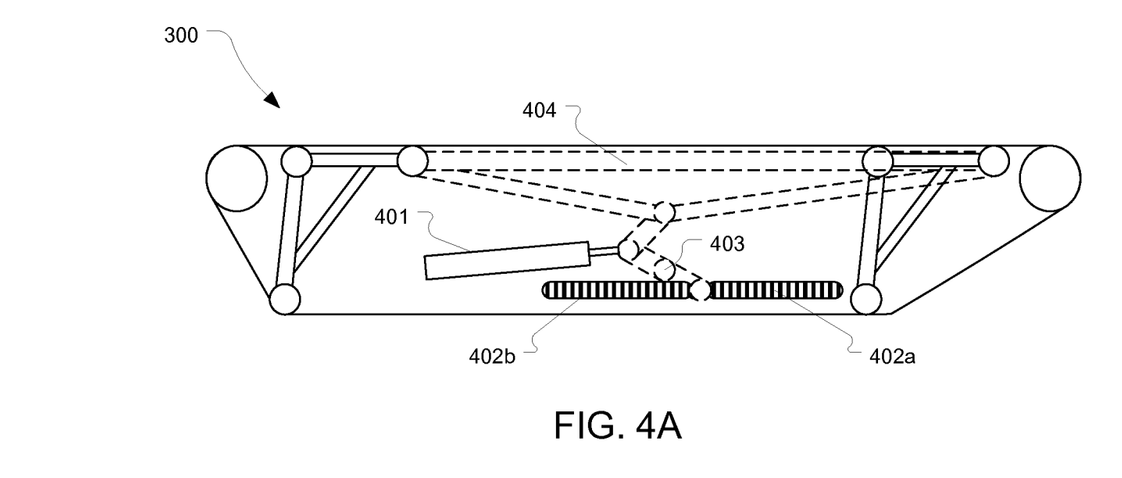
FIGS. 4A and 4B illustrate another lifting system in a raised and lowered position respectively in accordance with the present invention.
Figure 4B:
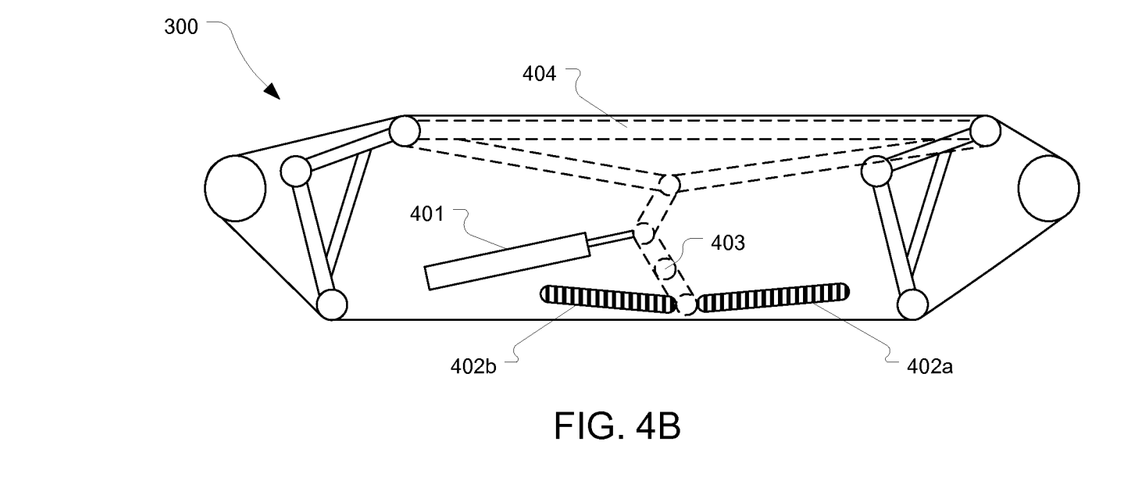

The lifting of conveyor 310 can be accomplished in various ways including using a linear or rotary actuator. FIGS. 4A and 4B provide an example of how a linear actuator can be used in lifting system 300. As shown, a linear actuator 401 is connected to a lifting support structure (generally shown as the components with dashed lines).

The lifting support structure includes a lifting tray 404 which lies underneath conveyor 310 to support the portion of conveyor 310 that is lifted (i.e. the portion where the slabs of sod are positioned when conveyor 310 is lifted to stacking head 120). The lifting support structure also includes various support bars as shown which are biased towards the lifted position via springs 402a and 402b. As shown in FIG. 4B, when linear actuator 401 extends, the support bars pivot around point 403. This pivoting causes lifting tray 404 to rise.

Springs 402a and 402b are configured so that, when lifting tray 404 is in the lifted position, the springs are in a relaxed state (i.e. absent linear actuator 401, lifting tray 404 would be biased towards the lifted position). Because of this, linear actuator 401 pulls lifting tray 404 back down to the lowered position which stores some energy in springs 402a and 402b. In the example shown in FIG. 4A, when lifting tray 404 is in the lowered position, spring 402b is in an extended state while spring 402a is in a compressed state.

Accordingly, when lifting tray 404 is to be lifted, springs 402a and 402b can provide some force to assist with the lifting. In other words, the springs accelerate the lifting tray when loaded and recapture energy when the lifting tray descends. Because of this, less power is required to lift the conveyor and therefore a smaller actuator can be used leading to savings in fuel consumption.

The springs also serve to reduce the velocity of the lifting system as it reaches the end of travel in both the up and down positions. In other words, the springs smooth out the forces required to halt the lifting system which reduces the stress on the lifting system and therefore extends its life.

In this manner, conveyor 310 can be temporarily raised towards stacking head 120 while conveyor 310 continues to rotate. Because the general position of conveyor 310 (or with respect to FIGS. 3A and 3B, the position of fixed components 301a and 301b) remains fixed, subsequent slabs can continue to be advanced on conveyor 310 even while the previous slabs are lifted towards stacking head 120.

Figure 5A:
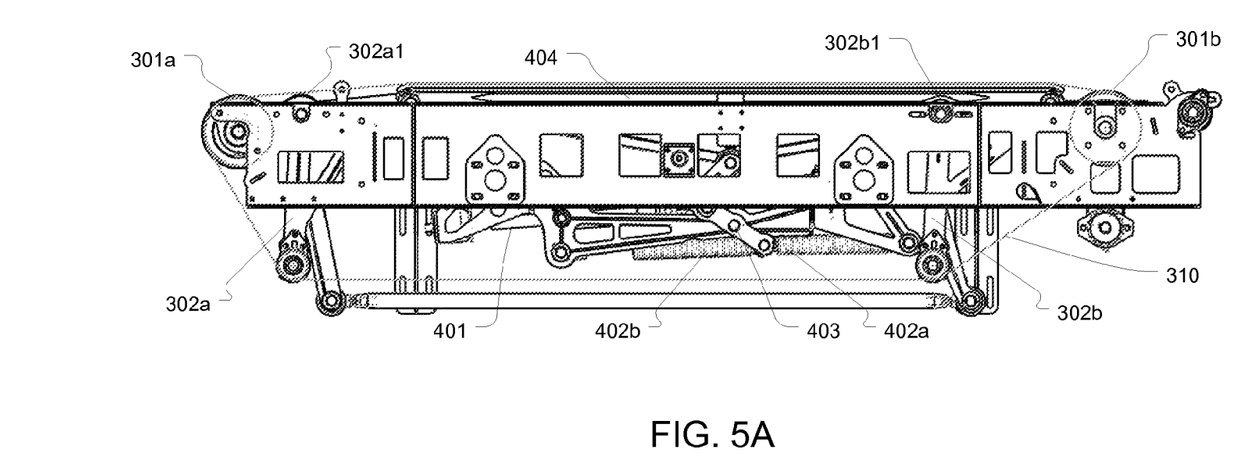
FIGS. 5A and 5B illustrate another lifting system in a raised and lowered position respectively in accordance with the present invention.
Figure 5B:
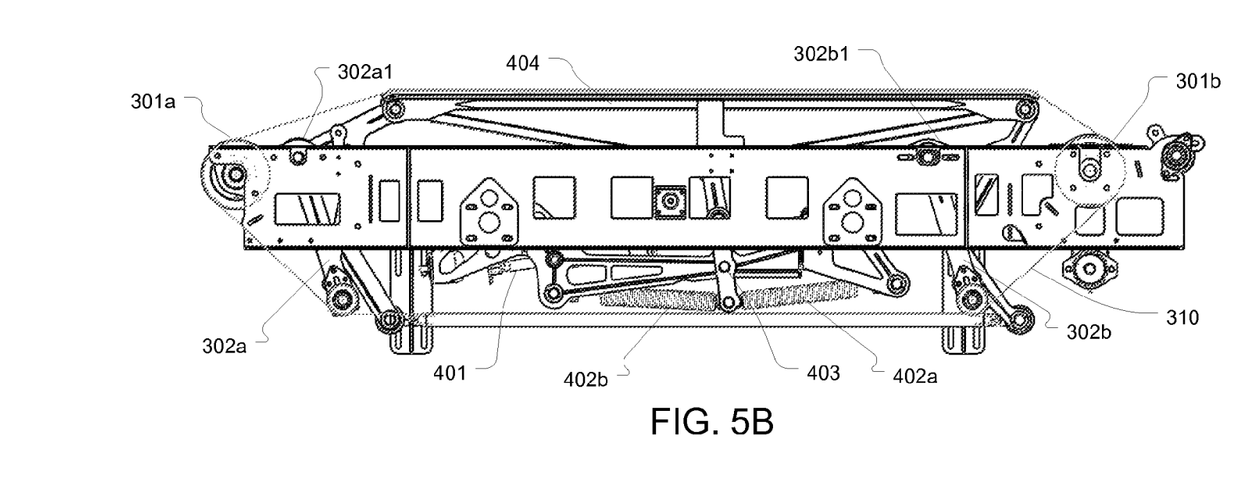

FIGS. 5A and 5B illustrate another example of a lifting system configured as described above with respect to FIGS. 3A, 3B, 4A, and 4B. The same reference numerals are used in FIGS. 5A and 5B as in the previous figures. FIG. 5A illustrates conveyor 310 in the lowered position while FIG. 5B illustrates conveyor 310 in the raised position. As shown in FIG. 5B, springs 402a and 402b are in a relaxed state. In contrast, in FIG. 5A, springs 402a and 402b are compressed and extended respectively.

Figure 6A:
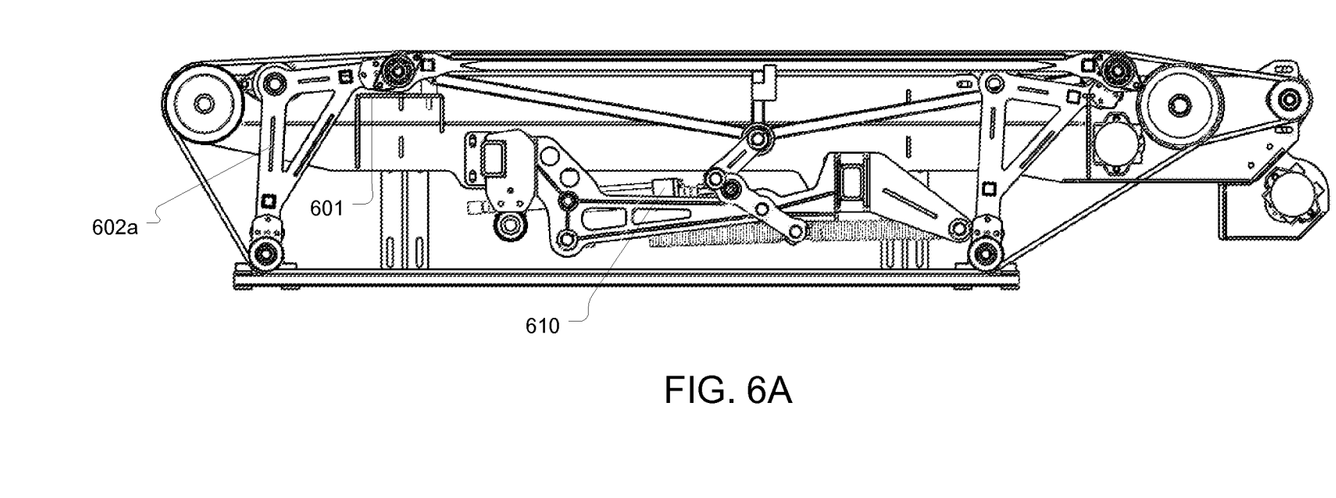
FIG. 6A illustrates a lifting system that employs a linear actuator.
Figure 6B:
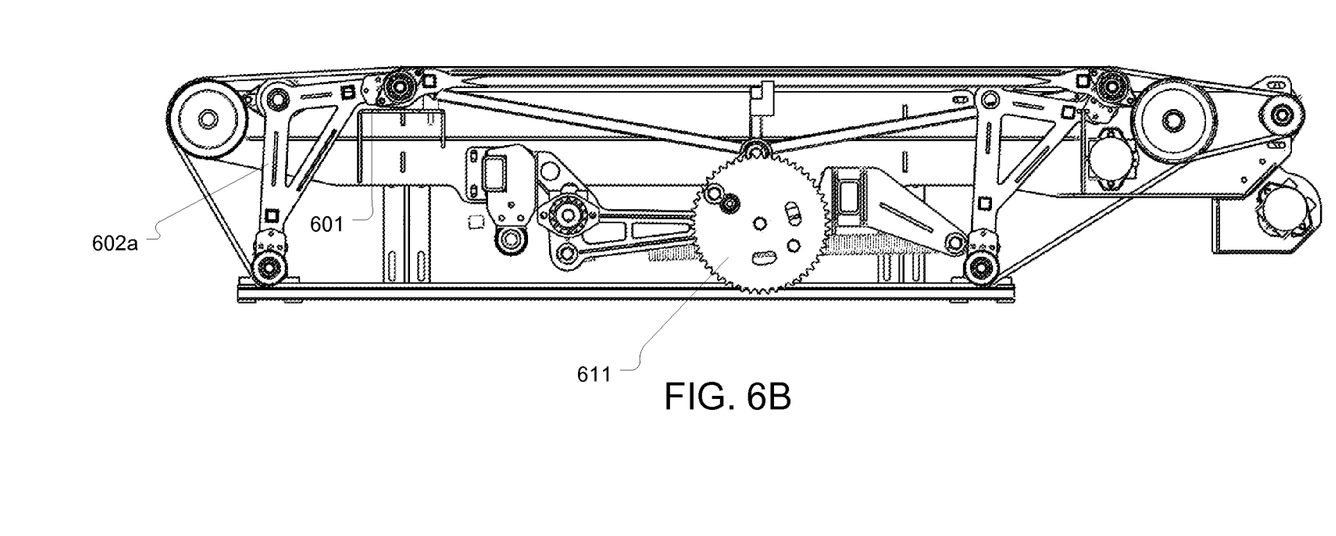
FIG. 6B illustrates a lifting system that employs a rotary actuator.

FIG. 6A illustrates another example of a lifting system that uses a linear actuator 610. In contrast, FIG. 6B illustrates an example of a lifting system that employs a rotary actuator 611. In both cases, the lifting system can function similarly to those described above with linear actuator 610 and rotary actuator 611 applying the necessary force to cause the conveyor to be lifted and lowered. Also, in both FIGS. 6A and 6B, a travel stop 601 is shown. Travel stop 601 can serve to limit the downward movement of pivoting component 602a.

The above described design of the lifting system provides many benefits over current lifting systems. For example, because the conveyor retains a consistent length and tension even though its external shape is changed, the lifting system is not overstressed thereby lowering maintenance costs and extending the lifetime of the conveyor.

Additionally, because the conveyor continues to rotate while retaining relatively consistent tension, slabs can continue to be advanced onto the conveyor even while other slabs are being lifted to the stacking head. This allows slabs to be spaced very close together thereby increasing the speed at which the sod harvesting machine can be operated.

Also, the design allows either electric or hydraulic actuators to be used. For example, because the springs decelerate the lifting system gradually, a rotary hydraulic actuator, which is often cheaper and easier to maintain, can be used. On the other hand, an electric rotary actuator can be used because it provides easy control of the angular position. A servo can be used to precisely control the raised and lowered position of the electric rotary actuator and to recapture much of the energy used to raise and lift the conveyor thus eliminating any need for springs 402a, 402b.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A lifting system for temporarily lifting a portion of a conveyor on a sod harvesting machine to allow one or more slabs of sod on the portion of the conveyor to be picked up by a stacking head, the lifting system comprising:
   a conveyor from which slabs of sod are picked up by a stacking head of a sod harvesting machine;
   a conveyor support structure around which the conveyor rotates, the conveyor support structure defining the shape of the conveyor, the conveyor support structure further including a plurality of fixed components and a plurality of pivoting components; and
   a lifting mechanism that causes the pivoting components of the conveyor support structure to pivot which lifts a portion of the conveyor upwards towards the stacking head thereby changing the shape of the conveyor while retaining consistent tension on the conveyor.

2. The lifting system of claim 1, wherein the conveyor support structure comprises a lifting tray positioned underneath the portion of the conveyor, the lifting tray being connected to the pivoting components such that the lifting tray is lifted when the pivoting components pivot upwardly.

3. The lifting system of claim 2, wherein the lifting mechanism comprises an actuator that applies a force to the conveyor support structure to cause the pivoting components to pivot.

4. The lifting system of claim 3, wherein the actuator comprises a linear or rotary actuator.

5. The lifting system of claim 3, wherein the conveyor support structure includes one or more springs which bias the pivoting components towards the upward position.

6. The lifting system of claim 5, wherein the actuator applies a force against the springs to maintain the pivoting components in the downward position.

7. The lifting system of claim 1, wherein the fixed components define the forward and backward extents of the shape of the conveyor.

8. The lifting system of claim 7, wherein the pivoting components have a triangular shape where one corner is fixed while the other corners rotate when the pivoting components pivot.

9. The lifting system of claim 8, wherein the upward and downward rotations of the other corners cause the shape of the conveyor to change.

10. The lifting system of claim 9, wherein, when the conveyor is in a lowered position, the portion of the conveyor between the fixed components has a substantially flat profile.

11. The lifting system of claim 10, wherein, when the portion of the conveyor is raised, the portion of the conveyor between the fixed components has a raised profile.

12. The lifting system of claim 1, wherein the conveyor support structure includes a travel stop that limits the downward rotation of the pivoting components.

13. The lifting system of claim 1, wherein the conveyor continues to rotate while the portion of the conveyor is lifted.

14. A lifting system for temporarily lifting a portion of a conveyor on a sod harvesting machine to allow one or more slabs of sod on the portion of the conveyor to be picked up by a stacking head, the lifting system comprising:

a conveyor from which slabs of sod are picked up by a stacking head of a sod harvesting machine; and a conveyor support structure around which the conveyor rotates, the conveyor support structure including:

a plurality of fixed rollers that define the front and back extents of the shape of the conveyor; and a plurality of pivoting components which rotate to cause a portion of the conveyor to be raised towards the stacking head while the conveyor retains a substantially constant tension.

15. The lifting system of claim 14, wherein the pivoting components are connected by a lifting tray that is positioned underneath the portion of the conveyor.

16. The lifting system of claim 14, further comprising:
an actuator for applying a force to cause the pivoting components to rotate.

17. The lifting system of claim 16, further comprising:
one or more springs which bias the pivoting components towards the raised position.

18. The lifting system of claim 17, wherein the actuator applies a force to the conveyor support structure to rotate the pivoting components to the lowered position, the force being sufficient to overcome the force applied by the springs to bias the pivoting components towards the raised position.

19. The lifting system of claim 17, wherein the springs decelerate the rotation of the pivoting components as the pivoting components approach the raised and lowered positions.

20. The lifting system of claim 16, wherein the actuator is one of:
an electric or hydraulic linear actuator; or
an electric or hydraulic rotary actuator.

\* \* \* \* \*